US010644377B2

(12) United States Patent
Olsson et al.

(10) Patent No.: US 10,644,377 B2
(45) Date of Patent: May 5, 2020

(54) RADIO ANTENNA POSITIONING

(71) Applicant: Telefonaktiebolaget L M Ericsson (publ), Stockholm (SE)

(72) Inventors: Bengt-Erik Olsson, Hovås (SE); Christina Larsson, Mölndal (SE); Ola Tageman, Göteborg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 673 days.

(21) Appl. No.: 14/779,657

(22) PCT Filed: Jun. 28, 2013

(86) PCT No.: PCT/EP2013/063687
§ 371 (c)(1),
(2) Date: Sep. 24, 2015

(87) PCT Pub. No.: WO2014/161610
PCT Pub. Date: Oct. 9, 2014

(65) Prior Publication Data
US 2016/0056523 A1 Feb. 25, 2016

(30) Foreign Application Priority Data
Apr. 2, 2013 (WO) .................. PCT/EP2013/056934

(51) Int. Cl.
*H01Q 1/12* (2006.01)
*H04B 17/12* (2015.01)
*H01Q 3/08* (2006.01)

(52) U.S. Cl.
CPC .......... *H01Q 1/125* (2013.01); *H01Q 1/1257* (2013.01); *H01Q 3/08* (2013.01); *H04B 17/12* (2015.01)

(58) Field of Classification Search
CPC .......... H01Q 1/125–1264; H01Q 3/00; H01Q 3/02–20; H01Q 5/08; H01Q 17/001;
(Continued)

(56) References Cited
U.S. PATENT DOCUMENTS 3,274,602 A * 9/1966 Randall .................... H01Q 3/01
343/762
3,698,000 A * 10/1972 Landry .................... H01Q 3/36
343/772
(Continued)

FOREIGN PATENT DOCUMENTS

DE 2947910 A1 6/1981
JP 2006166399 A * 6/2006
(Continued)

OTHER PUBLICATIONS

IEEE Computer Society, "IEEE Standard for Information technology—Telecommunications and information exchange between systems—Local and metropolitan area networks—Specific requirements", Part 15.3: Wireless Medium Access Control (MAC) and Physical Layer (PHY) Specifications for High Rate Wireless Personal Area Networks (WPANs), IEEE Std. 802.15.3c, Sep. 11, 2009, pp. 1-203, IEEE.
(Continued)

*Primary Examiner* — Cassi J Galt
(74) *Attorney, Agent, or Firm* — Patent Portfolio Builders, PLLC

(57) ABSTRACT

A method (400) for positioning a first and a second radio antenna comprising the steps of configuring (SI) the first antenna to have a main lobe L1 and configuring (52) the second antenna to be a directive antenna having a main lobe L2. The method also comprising the steps of transmitting (S3) a first alignment signal from the first antenna to the second antenna and positioning (S4) the second antenna based on the received first alignment signal, as well as
(Continued)

reconfiguring (S5) the first antenna to be a directive antenna having an antenna main lobe L3, the antenna main lobe L3 having a more narrow main lobe width than the antenna main lobe L1. The method provides a systematic approach to finding optimum antenna positions and corresponding main lobe directions which is especially suited for aligning directive radio antennas in NLOS communication scenarios.

18 Claims, 8 Drawing Sheets

(58) Field of Classification Search
CPC ............ H01Q 1/1257; H01Q 17/008; H01Q 13/00–28; H01Q 19/062; H04B 17/12
See application file for complete search history.

(56) References Cited

U.S. PATENT DOCUMENTS

| | | | | |
|---|---|---|---|---|
| 4,696,053 | A | 9/1987 | Mastriani et al. | |
| 4,901,086 | A * | 2/1990 | Smith | H01Q 1/425 343/753 |
| 5,563,618 | A * | 10/1996 | Tamura | H01Q 1/088 343/772 |
| 5,675,349 | A * | 10/1997 | Wong | G01S 13/426 343/910 |
| 5,945,948 | A * | 8/1999 | Buford | G01S 5/021 342/457 |
| 5,955,752 | A * | 9/1999 | Fukaya | G01S 7/032 257/275 |
| 6,009,124 | A * | 12/1999 | Smith | H01Q 1/246 375/267 |
| 6,023,242 | A | 2/2000 | Dixon | |
| 6,411,263 | B1 | 6/2002 | Neilson | |
| 8,385,305 | B1 * | 2/2013 | Negus | H04J 1/00 370/338 |
| 8,917,215 | B2 * | 12/2014 | Pohl | H01Q 13/06 343/753 |
| 2002/0090941 | A1 | 7/2002 | Zhang | |
| 2002/0137538 | A1 | 9/2002 | Chen et al. | |
| 2002/0164945 | A1 | 11/2002 | Olsen et al. | |
| 2004/0257300 | A1 | 12/2004 | Harvey | |
| 2008/0024365 | A1 | 1/2008 | Holmes et al. | |
| 2008/0088518 | A1 | 4/2008 | Charash et al. | |
| 2008/0284669 | A1 | 11/2008 | Hunton | |
| 2009/0243930 | A1 | 10/2009 | Tien | |
| 2011/0113137 | A1 | 5/2011 | Ramachandran et al. | |
| 2011/0177832 | A1 | 7/2011 | Huang | |
| 2012/0014367 | A1 * | 1/2012 | Caillerie | H04B 7/0639 370/345 |
| 2012/0026040 | A1 | 2/2012 | Hohne et al. | |
| 2012/0068880 | A1 | 3/2012 | Kullstam et al. | |
| 2012/0093144 | A1 | 4/2012 | Alberi-Morel et al. | |
| 2014/0173215 | A1 | 6/2014 | Lin et al. | |

FOREIGN PATENT DOCUMENTS

| | | |
|---|---|---|
| JP | 2010278807 A | 12/2010 |
| WO | 2013023226 A1 | 2/2013 |

OTHER PUBLICATIONS

J. Kyynarainen et al., A 3D micromechanical compass, Sensors and Actuators A, vol. 142, p. 561-568, 2008 (Year 2008).

J. Bouchaud, 3-Axis Gyroscope, the new killer product for cell phones, MEMSblog, https://memsblog.wordpress.com/2010/08/02/3-axis-gyroscopre-the-killer-product-for-cell-phones, Aug. 2010 (Year 2010).

Amplifier Research, "Antennas. State of the Art.", Jul. 2002, pp. 1-28 (retrieved on Jun. 26, 2018 from http://testequipmentdatasheets.com/index_cards/A/Amplifier_Research/antenna_brochure.pdf).

Annonymous, "Steerable aerial", The Penguin Dictionary of Physics, edited by John Culleme. 4th ed. Penguin. Jan. 1, 2009, pp. 1., Market House Books Ltd.

Liu, K. et al.,"Analysis of Pyramidal Horn Antennas Using Moment Methods", 8082 IEEE Transactions of Antennas and Propagation, Oct. 1, 1993, pp. 1379-1389, vol. 41, No. 10, New York, US.

Anonymus, "Model ATH4GB8, M1, M2 Antenna 4 GHz-8GHz", Dec. 6, 2009, pp. 1-2, retrieved on Jun. 18, 2019, retrieved from Internet: http://www.aworld.us/post/ATH4G8.pdf.

* cited by examiner

RADIO ANTENNA POSITIONING

TECHNICAL FIELD

The present disclosure relates to positioning of radio antennas, and in particular to transceiver arrangements and a method, as well as an antenna main lobe width altering device, for positioning a first and a second radio antenna.

BACKGROUND

Non-line-of-sight, NLOS, communication refers to wireless communication between a transmitter and at least one receiver where a transmitted signal propagates along at least one in-direct path between the transmitter and the at least one receiver. Such in-direct propagation paths can for example arise due to reflection and/or diffraction effects in the surrounding environment. It should be noted that, due to the above definition, NLOS communication herein comprises also communication wherein a line-of-sight, LOS, component exists in addition to the one or several NLOS propagation paths.

A directive radio antenna is an antenna which is configured to focus emitted electromagnetical energy in a pre-determined direction, i.e., in a given elevation angle and azimuth angle, thus providing an increased antenna gain in that pre-determined direction compared to other transmit directions. Herein, this focus of energy will be referred to as the antenna main lobe. Due to reciprocity, the direction of maximum transmit gain often co-incides with the direction of maximum receive gain, i.e., the elevation angle and azimuth angle of the transmit and receive antenna main lobes often co-incide. Thus, herein, no distinction will be made between transmit and receive antenna main lobes. It is however understood that transmit and receive antenna main lobes can differ both in width as well as azimuth angle and elevation angle.

In order to reach full potential in the communication capacity of a communication system utilizing one or several directive antennas, the directive antenna or antennas must be carefully positioned and the antenna main lobes directed with respect to each other in order to optimize the performance of the communication system in terms of, e.g., received signal power and bit-error-rate, BER.

A directive radio antenna when properly positioned and directed often provides superior communication system performance as compared to an isotropic antenna which radiates an equal amount of energy in all directions. However, a flawed positioning or directing may have dire consequences in terms of received signal power and BER. Thus, positioning and directing of radio antennas are crucial when, e.g., deploying a radio link such as a microwave radio link.

The directing of antenna main lobes in azimuth angle and elevation angle is often referred to as aligning of the radio antennas, even if said directing is not performed with respect to a line of sight, LOS, between antennas. Thus, herein, aligning of radio antennas refers to the directing of one or several antenna main lobes with respect to one or several inbound radio signals, and not necessarily to directing with respect to a physical location or direction of another antenna.

Positioning and aligning directive antennas, and especially antennas with narrow antenna main lobes, can be time consuming and thus costly. The reason being that propagation phenomena such as reflection, diffraction, and penetration may give rise to complicated received fields of electromagnetical energy, where, e.g., received signal power as a function of antenna main lobe direction is not a unimodal function of position and antenna main lobe direction. Hence there is a need for improvements in antenna aligning procedure to reduce antenna deployment time and cost.

Positioning and aligning directive antennas in NLOS communication systems can be especially challenging, due to that a plurality of propagation paths between transmitter and receiver exist. This is especially true in urban environments where finding a suitable NLOS propagation path often requires both positioning and directing of antennas. Hence there is a need for an antenna alignment procedure which allows efficient and accurate positioning and directing of antennas in NLOS communication environments.

SUMMARY

An object of the present disclosure is to provide at least a method and transceiver arrangements which seeks to mitigate, alleviate, or eliminate one or more of the above-identified deficiencies in the art and disadvantages singly or in any combination and to provide means for an improved positioning and directing of radio antennas.

This object is obtained by a method for positioning a first and a second radio antenna, the method comprises the step of configuring the first antenna to have an antenna main lobe L1 and also the step of configuring the second antenna to be a directive antenna having an antenna main lobe L2. The method also comprises the step of transmitting a first alignment signal from the first antenna to the second antenna, and positioning the second antenna based on the received first alignment signal. The method further comprises the step of re-configuring the first antenna to be a directive antenna having an antenna main lobe L3. The antenna main lobe L3 having a more narrow antenna main lobe width than the antenna main lobe L1.

According to an aspect, the method also comprises the step of transmitting a second alignment signal from the second antenna to the first antenna, and positioning the first antenna based on the received second alignment signal.

According to an aspect, the step of positioning the second antenna further comprises the step of directing the antenna main lobe L2 of the second antenna in elevation angle and azimuth angle based on the received first alignment signal. The step of positioning the first antenna further comprises directing the antenna main lobe L3 of the first antenna in elevation angle and azimuth angle based on the received second alignment signal.

According to an aspect, the step of positioning the second antenna further comprises aligning the second antenna with respect to the first alignment signal, and the step of positioning the first antenna further comprises aligning the first antenna with respect to the second alignment signal.

According to an aspect, the first and the second antenna are radio antennas adapted for communication in non-line-of-sight, NLOS, conditions.

A number of advantages are obtained by the above mentioned aspects of the disclosed method. For example, the disclosed method provides a systematic approach to finding optimum antenna positions and corresponding antenna main lobe directions which is especially suited for aligning directive radio antennas in NLOS communication scenarios. Thus, compared to previous approaches which comprise, e.g., iteratively positioning antennas and directing antenna main lobes starting from a coarse first set of positions and antenna main lobe directions, the deployment of radio links using directive antennas is simplified. Also, the probability of achieving favorable or even optimum communication conditions with respect to, e.g., received signal power, is increased by the disclosed method.

A further advantage is that the number of work steps is reduced in the positioning and antenna main lobe directing procedure, since more propagation paths are visible simultaneously by using the wider antenna main lobe L1 compared to using a more narrow antenna main lobe. This antenna installation simplification is likely to result in cost savings for communication network operators and in reductions in network roll-out time.

According to an aspect, the step of configuring the first antenna to have an antenna main lobe L1 further comprises using a radio transceiver having an open waveguide antenna interface configured to generate the antenna main lobe L1 when no antenna is connected to said waveguide antenna interface. Also, the step of re-configuring comprises connecting a directive antenna adapted to generate the antenna main lobe L3 when connected to the radio transceiver waveguide antenna interface.

The use of said open waveguide antenna interface further simplifies installation practice, since no additional antenna, or other antenna modification equipment is needed in the re-configuring step, i.e., to transform the antenna main lobe of the first antenna from a wider antenna main lobe L1 to a more narrow antenna main lobe L3.

According to an aspect, the step of re-configuring further comprises using an antenna main lobe width altering device comprising means for attachment to an existing antenna device. The antenna main lobe width altering device is adapted to receive a radio signal transmitted from the existing antenna device and to process the received radio signal and to re-transmit the radio signal using a secondary antenna main lobe different from the antenna main lobe of the existing antenna device.

According to an aspect, the secondary antenna main lobe is more narrow in beam width compared to the antenna main lobe of the existing antenna device.

According to an aspect, the secondary antenna main lobe is wider in beam width compared to the antenna main lobe of the existing antenna device.

According to an aspect, the step of directing the antenna main lobe L2 further comprises evaluating at least one performance metric as a function of the position of the second antenna and the direction of the antenna main lobe L2, the at least one performance metric comprising either of, or a combination of, a received signal power, a detection mean-squared-error, a bit error rate, and a mutual information. The step of positioning the second antenna also comprises selecting a preferred direction of the antenna main lobe L2 based on the at least one evaluated performance metric.

According to an aspect, the step of directing the antenna main lobe L3 further comprises evaluating at least one performance metric as a function of the position of the first antenna and the direction of the antenna main lobe L3, the at least one performance metric comprising either of, or a combination of, a received signal power, a detection mean-squared-error, a bit error rate, and a mutual information. The step of positioning the first antenna also comprises selecting a preferred direction of the antenna main lobe L3 based on the at least one evaluated performance metric.

According to an aspect, the step of directing the antenna main lobe L2 and the step of directing the antenna main lobe L3 both further comprise evaluating said at least one performance metric over a pre-determined duration of time to determine a first stability metric of the at least one performance metric, and wherein the selecting of a preferred direction of the antenna main lobe L2 and the antenna main lobe L3 is further based on said first stability metric.

According to an aspect, the step of directing the antenna main lobe L2 and the step of directing the antenna main lobe L3 both further comprise evaluating said at least one performance metric over a pre-determined frequency range to determine a second stability metric of the at least one performance metric. Further, the selecting of a preferred position of the antenna main lobe L2 and the antenna main lobe L3 is further based on said second stability metric.

An advantage of the determining of the first or the second stability metric of the at least one performance metric is that propagation paths and corresponding antenna positions and antenna main lobe directions which represent unstable propagation paths, and also propagation paths which by multipath propagation falsely appear to be suitable propagation paths, can be detected and discarded by application of aspects of the disclosed method.

An object of the present disclosure is also to provide a first and a second transceiver arrangement which seeks to mitigate, alleviate, or eliminate one or more of the above-identified deficiencies in the art. This object is obtained by a first transceiver arrangement comprising a first radio transceiver, an alignment tool connected to the first radio transceiver and a first antenna. The first antenna is arranged to be re-configurable between having an antenna main lobe L1 and having an antenna main lobe L3. The first radio transceiver is arranged to transmit a first alignment signal from the first antenna using the antenna main lobe L1. The first radio transceiver is also adapted to receive a second alignment signal by the first antenna using the antenna main lobe L3. The alignment tool is further adapted to measure at least one performance metric based on the second alignment signal as a function of the position of the first antenna and the direction of the antenna main lobe L3. The at least one performance metric comprises either of, or a combination of, a received signal power, a detection mean-squared-error, a bit error rate, and a mutual information.

According to an aspect, the alignment tool is further adapted to select a preferred position of the first antenna and a preferred direction of the antenna main lobe L3 based on the at least one evaluated performance metric.

The object stated above is consequently also obtained by a second transceiver arrangement comprising a second radio transceiver, a second antenna, and an alignment tool connected to the first radio transceiver. The second antenna is configured to be a directive antenna having an antenna main lobe L2 adjustable in direction. The second radio transceiver is adapted to receive a first alignment signal by the second antenna. The alignment tool is adapted to measure at least one performance metric based on the first alignment signal as a function of the position of the second antenna and the direction of the antenna main lobe L2. The at least one performance metric comprises either of, or a combination of, a received signal power, a detection mean-squared-error, a bit error rate, and a receiver mutual information. The second radio transceiver is further arranged to transmit a second alignment signal by the second antenna.

According to an aspect, the alignment tool is also adapted to select a preferred position of the second antenna and a preferred direction of the antenna main lobe L2 based on the at least one evaluated performance metric.

A further object of the present disclosure is to provide an antenna main lobe width altering device which seeks to mitigate, alleviate, or eliminate one or more of the above-identified deficiencies in the art. This antenna main lobe width altering device comprises means for attachment to an existing antenna device. The antenna main lobe width altering device is adapted to receive a radio signal transmitted from an existing antenna device, and to process the received radio signal, as well as to re-transmit said radio signal using a secondary antenna main lobe different from the antenna main lobe of the existing antenna device. Thus, the disclosed antenna main lobe width altering device can be used to alter the main lobe shape, i.e., its width, without disassembling or otherwise altering existing antenna device.

According to an aspect, the antenna main lobe width altering device further comprises an absorption element arranged to absorb a first part of the emitted electromagnetic energy of the existing antenna device and to pass a second part of the emitted electromagnetic energy of the existing antenna device. Thus a modified antenna main lobe of the existing antenna device is provided for by the disclosed antenna main lobe width altering device.

According to an aspect, the antenna main lobe width altering device comprises a dielectric lens arrangement and an absorption element. The dielectric lens arrangement is arranged to guide the emitted electromagnetic energy of the existing antenna device from the existing antenna into a modified antenna aperture. The absorption element is arranged to absorb a first part of the emitted electromagnetic energy of the existing antenna device and to pass a second part of the emitted electromagnetic energy of the existing antenna device. Thus a modified antenna main lobe of the existing antenna device is provided for by the disclosed antenna main lobe width altering device.

According to an aspect, the antenna main lobe width altering device further comprises a metallic tube arrangement with varying inner dimension. The metallic tube arrangement is adapted to guide the emitted electromagnetic energy of the existing antenna device from the aperture of the existing antenna into a modified antenna aperture. Thus a modified antenna main lobe of the existing antenna device is provided for by the disclosed antenna main lobe width altering device.

According to an aspect, the antenna main lobe width altering device further comprises a collector antenna, a signal conduit, and a secondary antenna. The collector antenna is arranged to receive the emitted electromagnetic energy of the existing antenna device and to forward said electromagnetic energy via the signal conduit to the secondary antenna. The secondary antenna, in turn, is arranged to re-transmit the electromagnetic energy using a secondary antenna main lobe, Thus a modified antenna main lobe of the existing antenna device is provided for by the disclosed antenna main lobe width altering device.

The various aspects of the disclosed antenna main lobe width altering device disclosed herein brings a number of advantages. For instance, by using the disclosed antenna main lobe width altering device the cost for extra installation equipment is reduced, e.g., the cost of having a re-configurable antenna which is left on site after installation, since the disclosed antenna main lobe width altering device can be re-used. The disclosed antenna main lobe width altering device also provides a versatile antenna main lobe re-configuring device which can be used to generate a plurality of different antenna main lobe shapes, link gains, frequency channels, band-widths, and output power levels.

A further advantage associated with the disclosed antenna main lobe width altering device is a lowered risk of damage to existing equipment during positioning and directing of the antenna main lobe, i.e., during radio link deployment. This is in part due to the feature of the disclosed means for attachment to an existing antenna device, which brings the advantage that the existing antenna need not be disassembled in any way, nor disconnected from the radio transceiver, in order to re-configure the antenna into having the more narrow antenna main lobe L3.

Yet another advantage associated with said antenna main lobe width altering device is that no remaining reduction in link gain after alignment is suffered. This is mainly due to the feature of the antenna main lobe width altering device being an add-on device and not a permanent fixture.

There is also the advantage of a lowered risk of finding positions or antenna main lobe directions which are optimal only for the alignment radio transceiver set-up and not for the radio transceiver set-up intended for final operation of the link, since the same radio is used both during alignment and final operation, and thus any peculiarities of that radio transceiver set-up is taken into account in the positioning and the directing of the antenna main lobes. In cases where a different radio is used during alignment compared to operation, the positioning and alignment of antennas may inadvertently be optimized based on unique characteristics of the alignment radio, which characteristics may differ from the radio used during operation.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
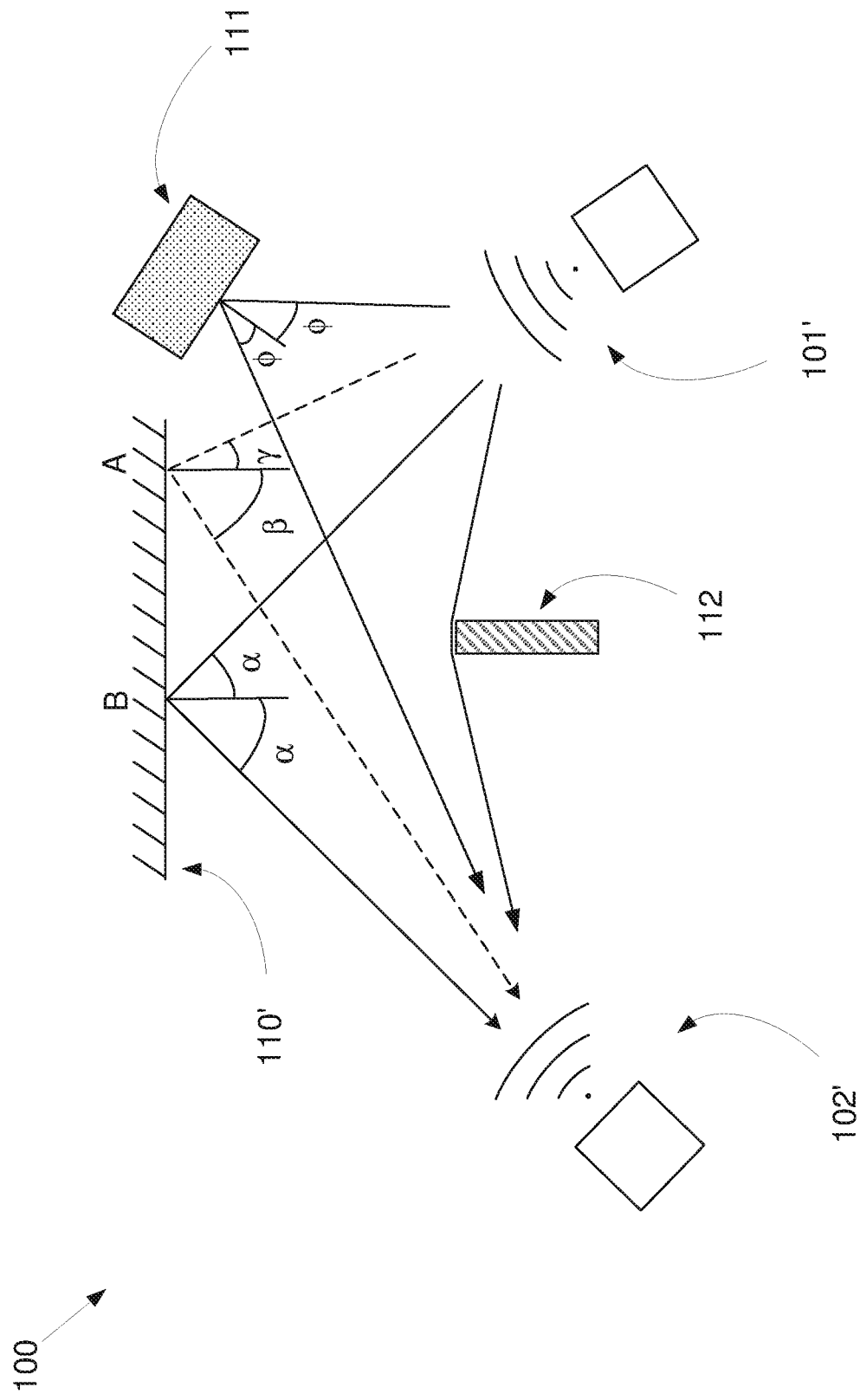
FIGS. 1-3 show schematic block diagrams of a non-line-of-sight radio links.

Aspects of the present disclosure will be described more fully hereinafter with reference to the accompanying drawings. The arrangements', devices, and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

FIG. 1 shows a first aspect of a radio link 100 comprising a first 101' and a second 102' transceiver arrangement arranged to communicate via a non-line-of-sight, NLOS, communication channel.

It is noted that, according to some aspects, the NLOS communication channel in FIG. 1 also comprises a line of sight, LOS, propagation path.

The radio link 100 has an option to utilize reflection in a wall 110' and also reflection in a first object 111, or diffraction via a second object 112, for communication between transceivers 101', 102' having directive antennas. Depending of how the two transceiver arrangements 101', 102' are positioned and on how the antennas of said transceiver arrangements 101', 102' are directed, the communication channel will be of varying quality, e.g., in terms of received signal power.

Assume first that the antenna of the first transceiver arrangement 101' is initially directed towards area A on the wall 110' and transmits a first alignment signal towards area A on the wall 110'. For a smooth wall, the law of reflection requires the output angle β to equal the incident angle γ in order for reflection to occur with minimum loss. This does not occur at area A since clearly γ does not equal β. However, this is the case around area B on the wall 110', where incident and output angles are equal, and also on the propagation path shown via the first object 111, where said angle is shown as φ.

Many materials, for instance façade materials, diffusely scatters energy and therefore some energy is likely to still reach the second transceiver arrangement 102' also at non-optimum alignment of the transceiver arrangement antennas. An example of such diffuse scattering is the propagation via area A on the wall 110'.

Two alternative propagation paths are also shown in FIG. 1. One such path is via reflection in the first object 111, another alternative option is via diffraction in the second object 112. Thus, when positioning the antennas of the transceiver arrangements 101', 102', positions and antenna main lobe directions must be chosen based on the propagation environment. This entails choosing a propagation path, and positioning and directing antennas accordingly.

An iterative approach has traditionally often been used when positioning and directing directive antennas in both LOS and in NLOS environments. This iterative approach entails that a first coarse positioning and directing is performed, following which the first antenna is directed to, e.g., maximize an incoming signal power. In doing so, the transmit antenna main lobe of the first antenna is also displaced, such that the reception conditions of the second antenna changes. The second antenna is therefore re-directed to, e.g., maximize incoming signal power. This again changes receive conditions at the first antenna, which is re-directed, and the process repeats until acceptable communication performance metrics are obtained.

Successful iterative alignment of the first 101' and second 102' transceiver arrangement requires the received signal strength, or whichever other performance metric is used for positioning and directing, to monotonically increase when moving the antenna main lobe in the direction towards the optimum communication conditions, i.e., that the received signal power, or other performance metric, used for evaluating a certain set of positions and antenna main lobe directions, is a unimodal function of direction and not a bi-modal or multi-modal function of antenna position and antenna main lobe direction.

Further, when the alignment signal is reflected in a not perfectly flat and sufficiently large surface, it will be distorted, possibly with break-ups in the energy patterns, which makes iterative alignment tedious and sometimes difficult due to the existence of sub-optima in the antenna main lobe direction at the receiver.

Also, if the initial coarse positioning and directing is of insufficient quality in the iterative procedure above, it is unlikely that both antennas eventually will be redirected in the best possible direction, e.g., towards area B where optimum reflection exists. This is because the received power is likely to be constant due to the diffuse scattering along the wall with no power gradient towards the optimum point of reflection.

Further, if the first coarse position and direction is set with respect to, e.g., the propagation path via the first object 111, it is unlikely that convergence to the propagation path via the second object 112, or via area B on the wall 110' will be reached via iterations, since these paths will represent too weak received signal components in order to be visible from the second transceiver arrangement 102' point of view during iterations.

One way of tackling the NLOS communication problems discussed above is to use low radio transmission frequencies, i.e., below approximately 6 GHz, with wide main lobe antennas, typically 30-90 degrees in azimuth or elevation direction, which emit energy which propagate via many paths to the receiver. Such systems will henceforth be referred to as sub-6 GHz links. These systems offer much simpler alignment procedures, since virtually no alignment is required, due to that the antennas have wide antenna main lobes and also that the systems often comprise a digital signal processor, DSP, in the receiver which is arranged to compensate for the effects of signals propagating along different paths from transmitter to receiver.

A problem with the sub-6 GHz systems is that the power budget for NLOS propagation is limited due to the use of wide main lobe antennas. For example, a typical sub-6 GHZ wide main lobe antenna can give a gain of approximately 15 dBi whereas a typical narrow antenna main lobe antenna at high frequencies, i.e., above 6 GHz, is often able to provide an antenna gain in excess of 30 dBi.

Figure 2:
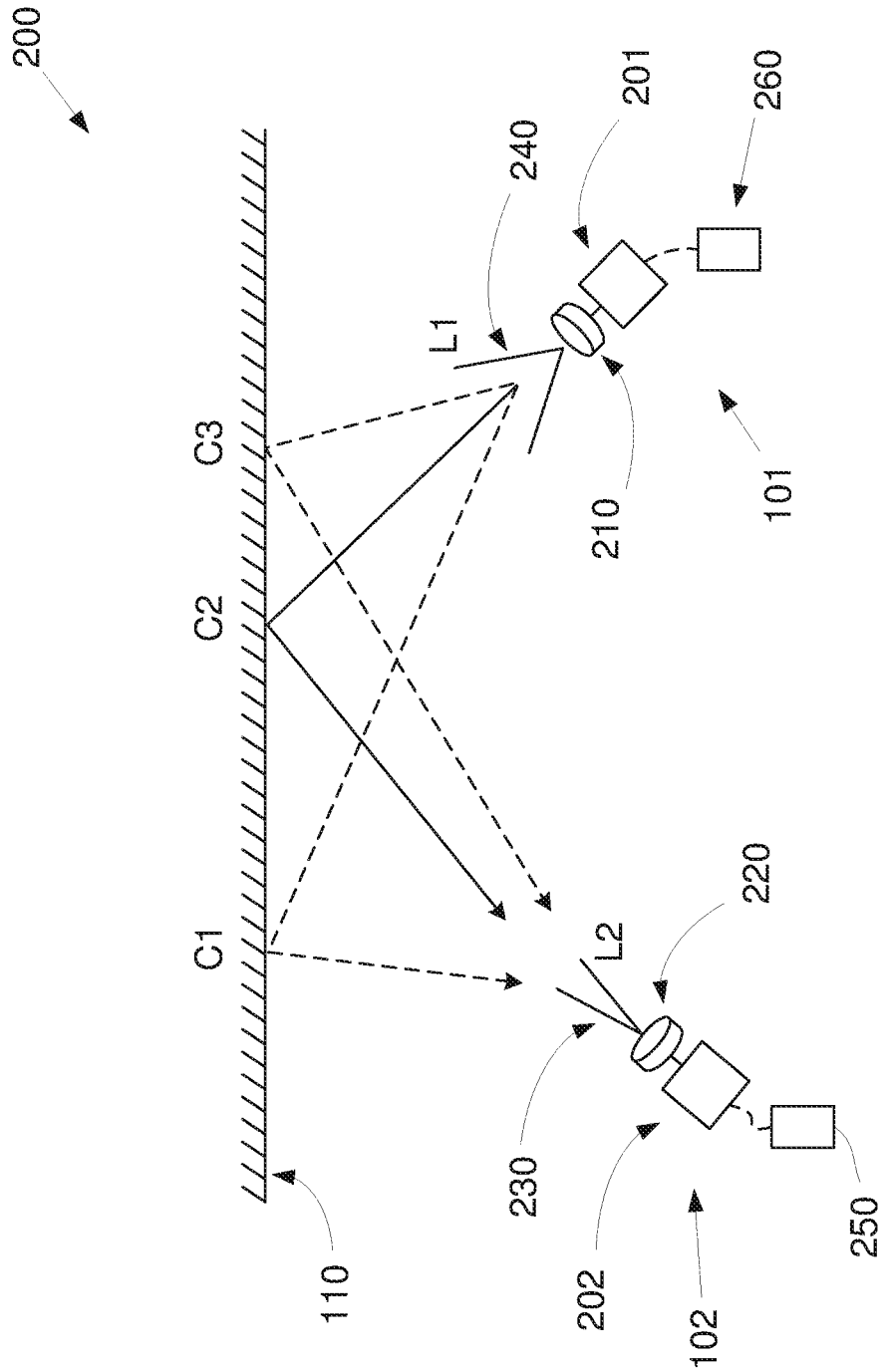

FIG. 2 shows a second example of a radio link 200 comprising a first 101 and a second 102 transceiver arrangement which communicate using an NLOS propagation channel via reflection in an area C2 on a reflective object 110. The first transceiver arrangement 101 has an antenna main lobe L1 240, and the second transceiver arrangement 102 has an antenna main lobe L2 230.

Herein, the comparative term narrow when used in connection to an antenna main lobe width refers to the width measured in degrees of the antenna main lobe in azimuth angle or elevation angle, or both.

Herein, the comparative term wide when used in connection to an antenna main lobe width refers to the width measured in degrees of the antenna main lobe in azimuth angle or elevation angle, or both.

According to an aspect, the first antenna main lobe L1 240 is a wide antenna lobe compared to the second antenna main lobe L2 230, i.e., on the order of 20-90 degrees in azimuth direction. Thus, the antenna main lobe L1 240 radiates electromagnetic energy to cover a larger area than the more narrow antenna main lobe L2 230. Consequently, more alternative propagation paths are likely to be visible from the point of view of the second transceiver arrangement 102 compared to from the first transceiver arrangement 101.

According to a further aspect, the second transceiver arrangement 102 utilizes an isotropic antenna which radiates uniformly at least in azimuth direction. The second antenna main lobe L1 then has a width of 360 degrees at least in azimuth direction, thus covering the entire surrounding in a uniform manner.

FIG. 2 thus illustrates a top view of an NLOS channel where a wide first antenna main lobe 240 is used to find a suitable reflection point in the reflective object 110' with respect to the receiving second antenna 220.

When a sufficiently large part of the reflective object 110 is illuminated with electromagnetic energy, alignment of the more narrow antenna main lobe of the second transceiver arrangement 102 becomes less complicated since in this case the reflection point satisfying the required condition of input angle equal to output is illuminated by the wide antenna main lobe L1, and thus provides a maximum power received signal given that the second antenna is correctly aligned, i.e., corresponding to being directed towards area C2 on the reflective object 110.

Since the more narrow main lobe antenna at the second transceiver arrangement 102 is now directed towards a suitable area on the reflective object 110, i.e., area C2, and not directed towards a sub-optimal area like area C1 or area C3, the wide main lobe antenna at the first transceiver arrangement 101 can be modified into a more narrow main lobe antenna, whereupon positioning of antennas and directing of antenna main lobes can be performed in a conventional manner, possibly even using the iterative approach described above. This is shown and discussed in more detail in connection to FIG. 3 below.

The coverage of the wide main lobe antenna can of course be extended in both horizontal and vertical dimension, i.e., both elevation angle and azimuth angle, but depending on the NLOS environment it may be beneficial to utilize a sector antenna that has a wide horizontal antenna main lobe but a narrow vertical antenna main lobe in order to improve the antenna gain.

It should be noted that a path through the NLOS channel may be unstable, even though it shows promising performance metrics in terms of, e.g., received signal power during the start of the alignment procedure. In principle a power maximum can arise from multipath interference where constructive interference happen to arise at some settings of the wide main lobe antenna. If this happens, the path may or may not perform well after replacing the wide main lobe antenna with a more narrow one. As an example, the two paths propagating via area C1 and C3 may arrive in phase at the second antenna 230, thus resulting in a potentially strong received signal. However, this strong received signal will not be stable over frequency. In a two-path channel, such as the channel created by propagation from the first antenna 210 to the second antenna 220 via reflection in both of the areas C1 and C3, propagation gain will behave like in a two-path channel model, which exhibits regularly spaced notches in the propagation gain when considered in the frequency domain.

Further, even if a power maximum exists also with the narrow main lobe antenna it may disappear at some point in time if propagation conditions changes. This can happen due to an environmental change such as a change in temperature or humidity, or due to a small physical change in the obstacle, such as the opening or closing of windows in the wall of a building.

A simple characterization to account for such effects is to measure the stability of the performance metric by a stability metric, e.g., received signal power, minimum-square error, MSE, mutual information, or other performance metric over time, and subsequently choose optimum alignment based also on this stability.

According to an aspect, the stability metric is represented by a measure of variance of the performance metric.

According to an aspect, the measure of variance used to represent the stability metric is computed as the mean squared deviation from the mean value of the performance metric.

Another way of investigating the quality of a discovered promising antenna position and main lobe direction of a given antenna is to measure the frequency bandwidth of the channel at the antenna settings providing optimum power. This can be done using a conventional radio aligned with as wide bandwidth signal, i.e., high bit-rate or wide band signal, and measuring the received power or another quality measure such as MSE or data link capacity and subsequently compare with a signal with lower bandwidth. Another possibility is to scan a large frequency band with a narrow bandwidth signal and measure how the performance metrics vary over this bandwidth.

Of course there may be limitation in the available bandwidth due to regulations, but some frequency bands, e.g. frequency bands at 60 GHz or higher allows at least temporary wide bandwidth scans. Yet another alternative to obtain a quality measure of a propagation path, i.e., a set of antenna positions and antenna main lobe directions, is to slightly modify the path length while observing the calculated performance metric. This can be done by spatially moving an antenna, either the transmit or the receive antenna, in a controlled or random fashion in order to change the NLOS path lengths at least a fraction of the wavelength of the radio frequency carrier. In either of the quality analysis set-ups above the performance metric should be recorded during scan or movement. For a stable high quality propagation path, the performance metric should be stable over the complete scan/movement while for a power maximum created by multi-path interference, the performance metric can be expected to vary significantly with position.

Alignment tools 260, 250 are also shown in FIG. 2. These alignment tools 250, 260 are according to an aspect arranged to generate a first and a second alignment signal, respectively. These alignment signals are then arranged to be transmitted by the first 201 and the second 202 radio transceiver by the first 210 and the second 220 antenna respectively.

An alternative to generating the first and the second alignment signal by the alignment tools 250, 260 is to generate the first and the second alignment signal by the first 201 and the second 202 radio transceivers.

According to an aspect, the alignment tools 250, 260 are further arranged to receive the first and the second alignment signal, respectively, and to process said alignment signals in order to determine at least one performance metric. The at least one performance metric comprising either of, or a combination of, a received signal power, a detection mean-squared-error, a bit error rate, and a mutual information measured between transceivers. In this way, the alignment tools can be used to determine the suitability of a given position and direction of either or both of the first 210 and the second 220 antenna. The position and direction of the first 210 and second 220 antenna can then be changed, and the corresponding change in performance metric recorded. Thus, a change in position or direction can be evaluated.

According to an aspect, received signal power is measured by a power detector applied to the received alignment signal.

According to an aspect, detection mean-squared-error is measured using a detector arranged to detect modulated information symbols comprised in the first and in the second alignment signal. The mean-squared-error is then calculated as the mean of the squares of the differences between received information symbol values and corresponding detected information symbol values. Said information symbols are according to an aspect modulated using quadrature amplitude, QAM, modulation, or phase shift keying, PSK, modulation.

According to an aspect, bit-error-rate, BER, is measured using a detector arranged to detect modulated information symbols comprised in the first and in the second alignment signal. Each detected information symbol is mapped to a pre-determined sequence of detected data bits, and compared to a known sequence of data bits. BER is then calculated as the ratio of erroneous detected data bits compared to correctly detected data bits.

According to an aspect, mutual information between the first 101 and the second 102 transceiver is measured using a known sequence of information symbols which maps to a known sequence of transmitted information bits. The known information symbol sequence is comprised in the first and in the second alignment signal. The mutual information is measured under an assumption of additive white Gaussian noise.

Figure 3:
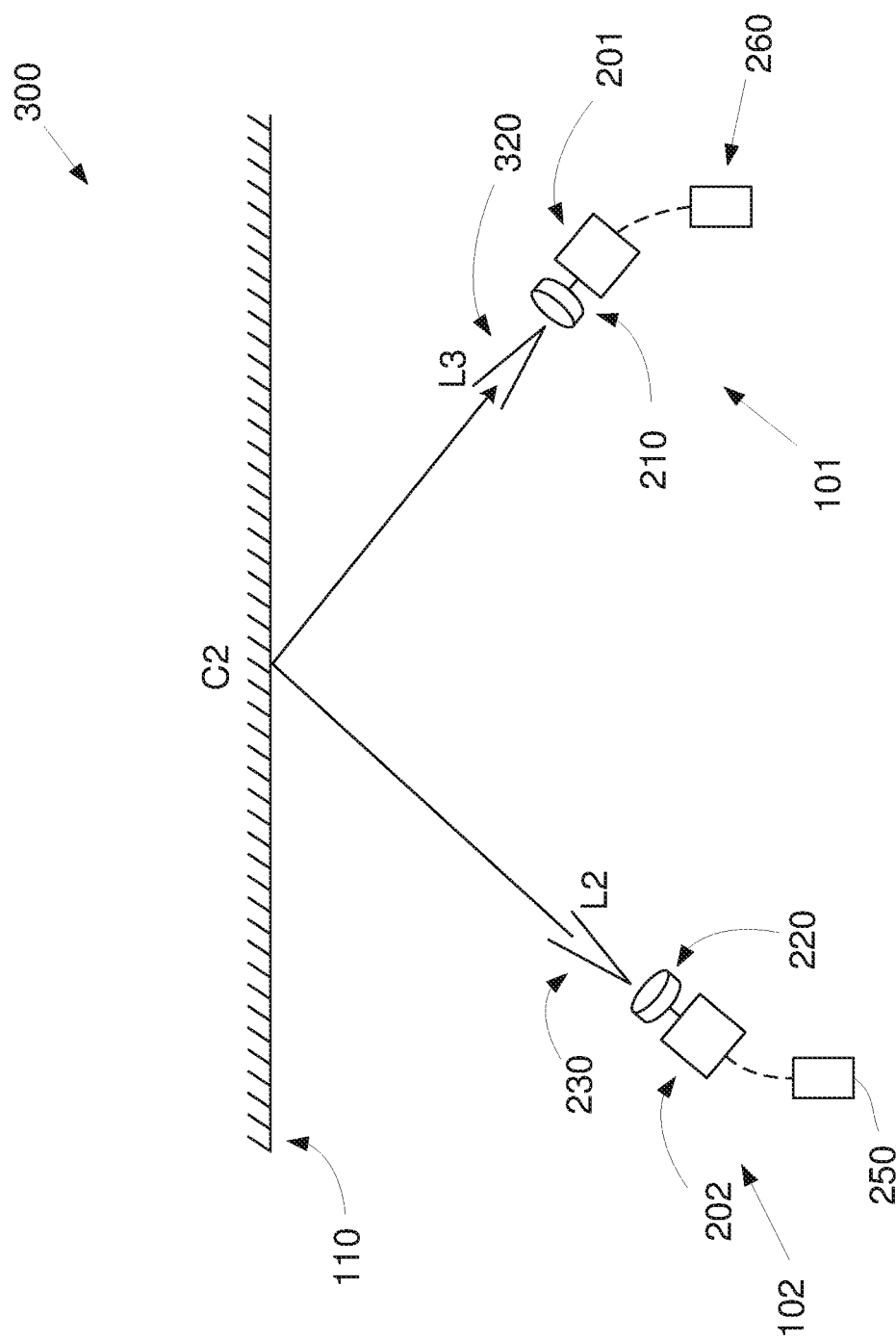

FIG. 3 shows the second phase of antenna alignment, i.e., the phase following the use of a wide antenna main lobe at the first transceiver 101. In FIG. 3, the antenna main lobe L1 240 has been re-configured into an antenna main lobe L3 320 with more narrow antenna main lobe width compared to the antenna main lobe L1 240.

According to aspects, the first radio antenna 220 comprises either or both of a vertically polarized and a horizontally polarized antenna. The second radio antenna 210 also comprises either or both of a vertically polarized and a horizontally polarized antenna. In such aspects of the disclosure the positioning of the first 220 and second 210 antenna constitutes independent positioning on horizontal and vertical polarization.

FIG. 3 also shows a first transceiver arrangement 101 comprising a first radio transceiver 201, an alignment tool 260 and a first antenna 210, the first antenna 210 being arranged to be re-configurable between having an antenna main lobe L1 240 and having an antenna main lobe L3 320. The first radio transceiver 201 is arranged to transmit a first alignment signal from the first antenna 210 using the antenna main lobe L1 240. The first radio transceiver 201 is also adapted to receive a second alignment signal by the first antenna 210 using the antenna main lobe L3 320. The alignment tool 260 is adapted to measure at least one performance metric based on the second alignment signal as a function of the position of the first antenna 210 and the direction of the antenna main lobe L3 320. The at least one performance metric comprises either of, or a combination of, a received signal power, a detection mean-squared-error, a bit error rate, and a mutual information.

According to an aspect, the alignment tool 260 is also adapted to select a preferred position of the first antenna 210 and a preferred direction of the antenna main lobe L3 320 based on the at least one evaluated performance metric.

FIG. 3 further shows a second transceiver arrangement 102 comprising a second radio transceiver 202, a second antenna 220, and an alignment tool 250. The second antenna 220 is configured to be a directive antenna having an antenna main lobe L2 230 adjustable in direction. The second radio transceiver 202 is adapted to receive a first alignment signal by the second antenna 220. The alignment tool 250 is adapted to measure at least one performance metric based on the first alignment signal as a function of the position of the second antenna 220 and the direction of the antenna main lobe L2 230. The at least one performance metric comprises either of, or a combination of, a received signal power, a detection mean-squared-error, a bit error rate, and a receiver mutual information. The second radio transceiver 202 is also arranged to transmit a second alignment signal by the second antenna 220.

According to an aspect, the alignment tool 250 is also adapted to select a preferred position of the second antenna 220 and a preferred direction of the antenna main lobe L2 230 based on the at least one evaluated performance metric.

Figure 4:
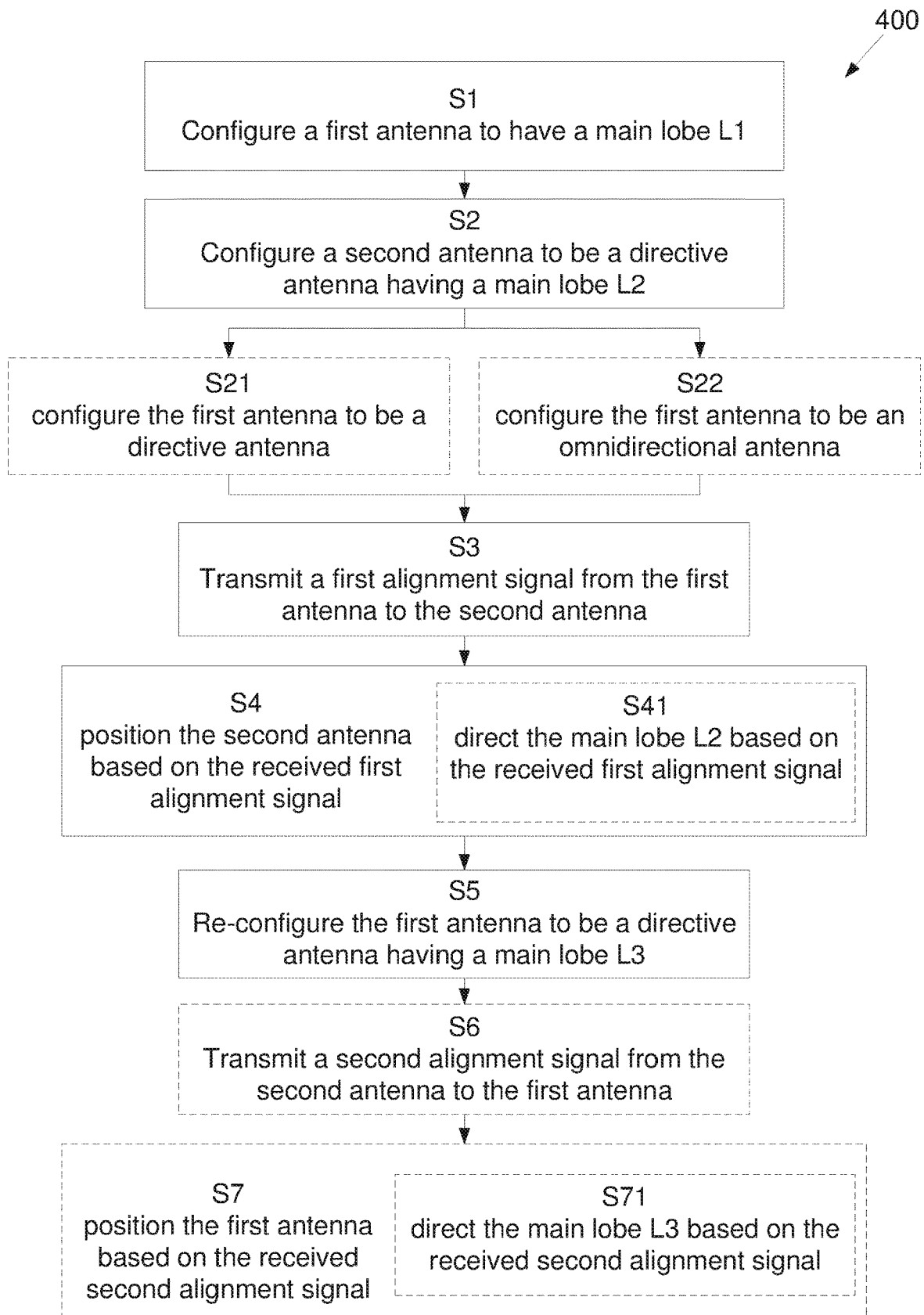
FIG. 4 shows a flowchart of a method of the disclosure.

FIG. 4 shows a flowchart of a method 400 of the disclosure for positioning a first 210 and a second 220 radio antenna. The method 400 comprises the steps of configuring S1 the first antenna 210 to have an antenna main lobe L1, and also configuring S2 the second antenna 220 to be a directive antenna having an antenna main lobe L2 230. The method also comprises the step of transmitting S3 a first alignment signal from the first antenna 210 to the second antenna 220, followed by the step of positioning S4 the second antenna 220 based on the received first alignment signal.

Since the antenna main lobe L1 is comparably wide, a larger part of the surrounding environment is illuminated by the transmitted electromagnetic energy from the first radio antenna 210. Consequently, a larger number of potential reflector areas can be seen from the point of view of the second radio antenna 220 as it is moved between different positions, and as varying azimuth angle and elevation angle are scanned by directing the antenna main lobe L2.

The method 400 then comprises the step of re-configuring S5 the first antenna 210 to be a directive antenna having an antenna main lobe L3 320, the antenna main lobe L3 having a more narrow antenna main lobe width than the antenna main lobe L1.

According to an aspect, the method 400 further comprises transmitting S6 a second alignment signal from the second antenna 220 to the first antenna 210, and positioning S7 the first antenna 210 based on the received second alignment signal.

Now, in the phase of positioning and directing the first antenna 210 having the antenna main lobe L3, a more traditional approach can be used. This is possible since a promising reflector has already been selected in the first phase of the method 400.

Thus the communication link between the first 101 and the second 102 transceiver arrangement is optimized based on the surrounding propagation environment.

It should be noted, that although no line-of-sight, LOS, propagation path between the first 210 and the second 220 radio antenna is shown, this is in no way meant to limit the disclosure to NLOS communication only. On the contrary, the NLOS communication channel is herein according to aspects assumed to comprise also a LOS propagation path.

As already mentioned above, the directing of antenna main lobes in azimuth angle and elevation angle is at times referred to as aligning of the radio antennas, even if said directing is not performed with respect to a line of sight, LOS, between antennas. Thus, herein, aligning of radio antennas refers to the directing of one or several antenna main lobes with respect to one or several inbound radio signals, and not necessarily to directing with respect to a physical location or direction of another antenna.

Consequently, according to an aspect, the step of positioning S4 the second antenna 220 further comprises aligning the second antenna 220 with respect to the first alignment signal, and the step of positioning S7 the first antenna 210 further comprises aligning the first antenna 210 with respect to the second alignment signal.

According to an aspect, the first 210 and the second 220 antenna are radio antennas adapted for communication in non-line-of-sight, NLOS, conditions.

According to an aspect, the method 400 further comprises the introductory step of configuring S21 the first antenna 210 to be a directive antenna having the antenna main lobe L1 240, and the further step of re-configuring S5 the first antenna 210 also comprises modifying the first antenna 210 to have an antenna main lobe L3 320, which antenna main lobe L3 320 constitutes a more narrow lobe with higher antenna gain than the antenna main lobe L1 240.

According to an aspect, the method 400 also comprises the introductory step of configuring S22 the first antenna 210 to be an omnidirectional antenna having a uniform and omnidirectional antenna main lobe L1. The further step of re-configuring S5 the first antenna 210 also comprises modifying the first antenna 210 to be a directive antenna having the antenna main lobe L3 320.

As also shown in FIG. 4, the step of positioning S4 the second antenna 220 according to an aspect comprises the step of directing S41 the antenna main lobe L2 230 of the second antenna 220 in elevation angle and azimuth angle based on the received first alignment signal. Also, the step of positioning S7 the first antenna 210 further comprises directing S71 the antenna main lobe L3 320 of the first antenna 210 in elevation angle and azimuth angle based on the received second alignment signal.

One key aspect of the disclosure relates to the obtaining of a wider antenna main lobe compared to an existing antenna main lobe width in practical deployment scenarios.

An aspect of the disclosure is therefore to temporarily replace a narrow main lobe antenna intended to be installed with the radio link equipment with a wider main lobe antenna arranged to simplify positioning and directing of antennas according to the present technique.

According to an aspect, the step of re-configuring S5 also comprises replacing an initially deployed first antenna 210 having the antenna main lobe L1 240 by a directive antenna having the antenna main lobe L3 320.

Figure 8B:
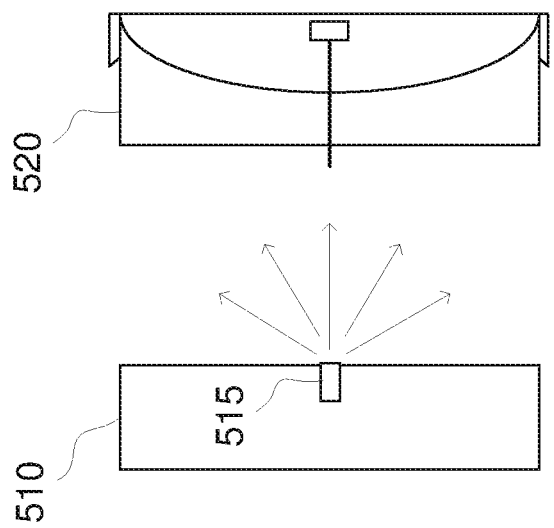
FIG. 8b shows an example of a directive antenna detached from the radio transceiver.
Figure 8A:
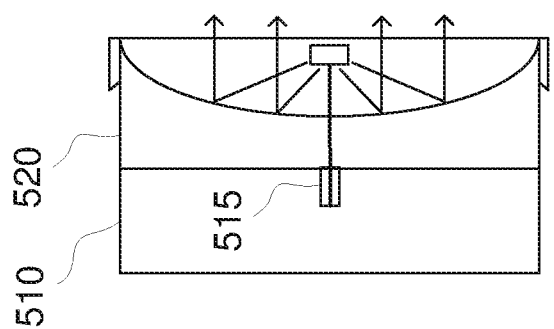
FIG. 8a shows an example of a directive antenna connected to a radio transceiver.

Certain radio transceivers 510 are connected to an antenna 520 via an open waveguide antenna interface 515, as shown in the example of FIG. 8a, which allows for detachment of the antenna 520 from the radio transceiver 510 arrangement, as shown in the example of FIG. 8b. Thus, some such open waveguide antenna interfaces 515 allow for disconnecting the antenna 520 from the radio transceiver 510 and using the waveguide interface 515 itself as an antenna. A less complicated alternative to a specially designed antenna is therefore to detach the antenna and use an open waveguide from the radio unit to radiate in suitable directions.

Consequently, according to an aspect, and assuming the above-mentioned open waveguide antenna interface 515 is present, the step of configuring S1 the first antenna 210 to have an antenna main lobe L1 also comprises using a radio transceiver 510 having an open waveguide antenna interface 515 configured to generate the antenna main lobe L1 240 when no antenna 520 is connected to said waveguide antenna interface 515 (e.g., as in FIG. 8b). Also, the step of re-configuring S5 comprises connecting a directive antenna 520 adapted to generate the antenna main lobe L3 320 when connected to the radio transceiver waveguide antenna interface 515 (e.g., as in FIG. 8a).

Another aspect relates to including a wide main lobe antenna option into the radio link equipment. This could, e.g., be accomplished mechanically inside the antenna housing.

Yet another aspect uses a steerable antenna array where the antenna pattern comprising the main lobe can be controlled by a steering unit.

According to an aspect, the first antenna 210 comprises an antenna array with a steerable antenna pattern, and the step of re-configuring S5 comprises steering said antenna pattern from an antenna pattern comprising the antenna main lobe L1 240 into a directive antenna pattern comprising the antenna main lobe L3 320.

A further aspect relates to attaching an add-on unit to an existing narrow main lobe antenna which add-on unit suitably widens the antenna main lobe. Aspects of said add-on unit will be further discussed below in connection to FIGS. 5-7.

According to an aspect, the step of re-configuring S5 comprises using an antenna main lobe width altering device 500, 500', 600, 600' comprising means for attachment 505 to an existing antenna device 520. The antenna main lobe width altering device 500, 500', 600, 600' is adapted to receive a radio signal transmitted from the existing antenna device 520 and to process the received radio signal and to re-transmit the radio signal using a secondary antenna main lobe different from the antenna main lobe of the existing antenna device 520.

Thus, the antenna main lobe width altering device is able to widen the antenna main lobe of an existing antenna device without disassembling or otherwise altering the existing antenna.

According to aspects of the disclosed method, the method also comprises the step of evaluating at least one performance metric as a function of the position of the antenna and the direction of the main lobe of said antenna. The at least one performance metric comprises either of, or a combination of, a received signal power, a detection mean-squared-error, a bit error rate, and a mutual information. The step of positioning the second antenna also comprises selecting a preferred direction of the main lobe of the antenna based on the at least one evaluated performance metric.

According to an aspect, the preferred direction is the direction which yields the highest, i.e., most favorable, performance metric.

The disclosed method, according to some aspects, also comprises the step of evaluating the at least one performance metric mentioned above over a pre-determined duration of time to determine a first stability metric of the at least one performance metric. The selecting of a preferred direction of the main lobe of the antenna is further based on said first stability metric.

Also, the disclosed method according to some aspects comprises the step of evaluating said at least one performance metric over a pre-determined frequency range to determine a second stability metric of the at least one performance metric. The selecting of a preferred position of the main lobe of the antenna is further based on said second stability metric.

Figure 5B:
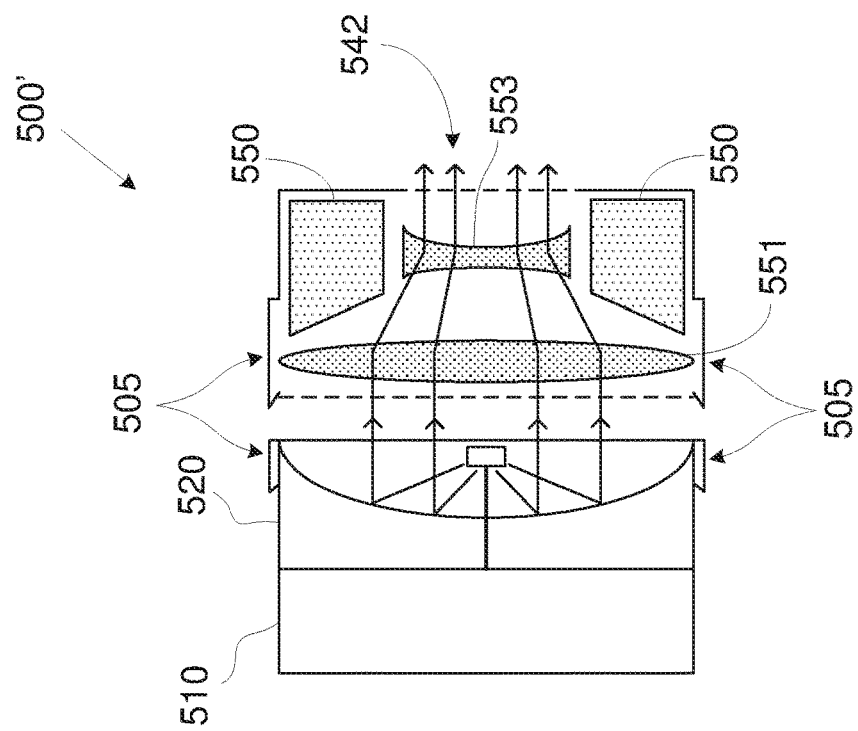
FIGS. 5-6 show embodiments of an antenna main lobe width altering device.
Figure 5A:
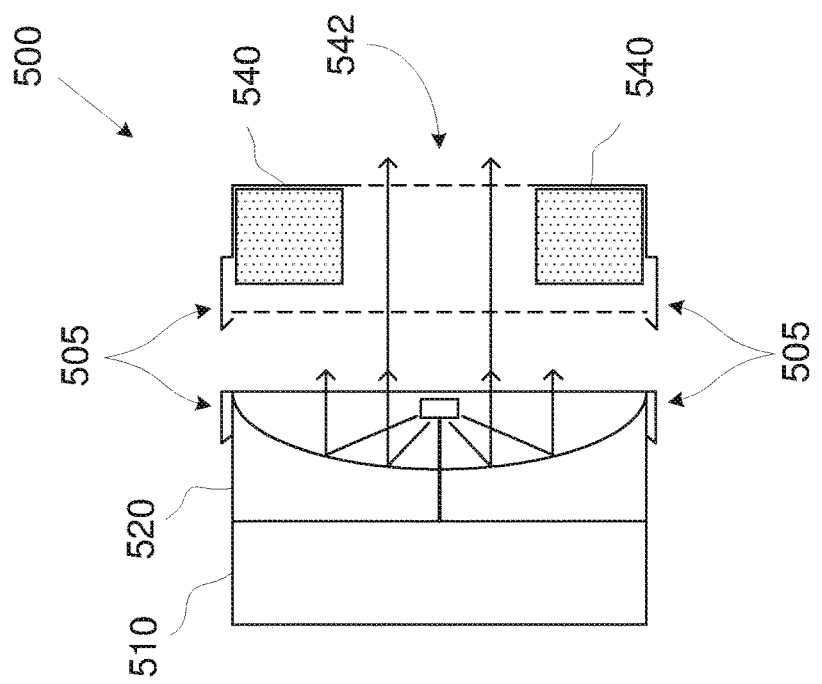

FIG. 5a shows a first aspect of the antenna main lobe width altering device 500. Here a temporarily attached arrangement is used which temporarily adds a shield and absorption element 540 onto an existing antenna 520, the absorption element 540 is arranged to only pass the centre-most part of the emitted electromagnetic field out from the antenna. In doing so, a wider beam is generated compared to the beam generated by the existing antenna 520 when the antenna main lobe width altering device 500 is not attached.

According to an aspect, the antenna main lobe width altering device 500 further comprises an absorption element 540 arranged to absorb a first part of the emitted electromagnetic energy of the existing antenna device 520 and to pass a second part of the emitted electromagnetic energy of the existing antenna device 520, thus providing a modified antenna main lobe of the existing antenna device 520.

FIG. 5b shows a second aspect of the antenna main lobe width altering device 500'. According to this aspect, a dielectric lens arrangement 551, 553 is used to reduce the power lost in absorption elements 550.

According to an aspect, the antenna main lobe width altering device 500' further comprises a dielectric lens arrangement 551, 553 and an absorption element 550. The dielectric lens arrangement 551, 553 is arranged to guide the emitted electromagnetic energy of the existing antenna device 520 from the existing antenna 520 into a modified antenna aperture 542. The absorption element 550 is arranged to absorb a first part of the emitted electromagnetic energy of the existing antenna device 520 and to pass a second part of the emitted electromagnetic energy of the existing antenna device 520, thus providing a modified antenna main lobe of the existing antenna device 520.

Figure 6B:
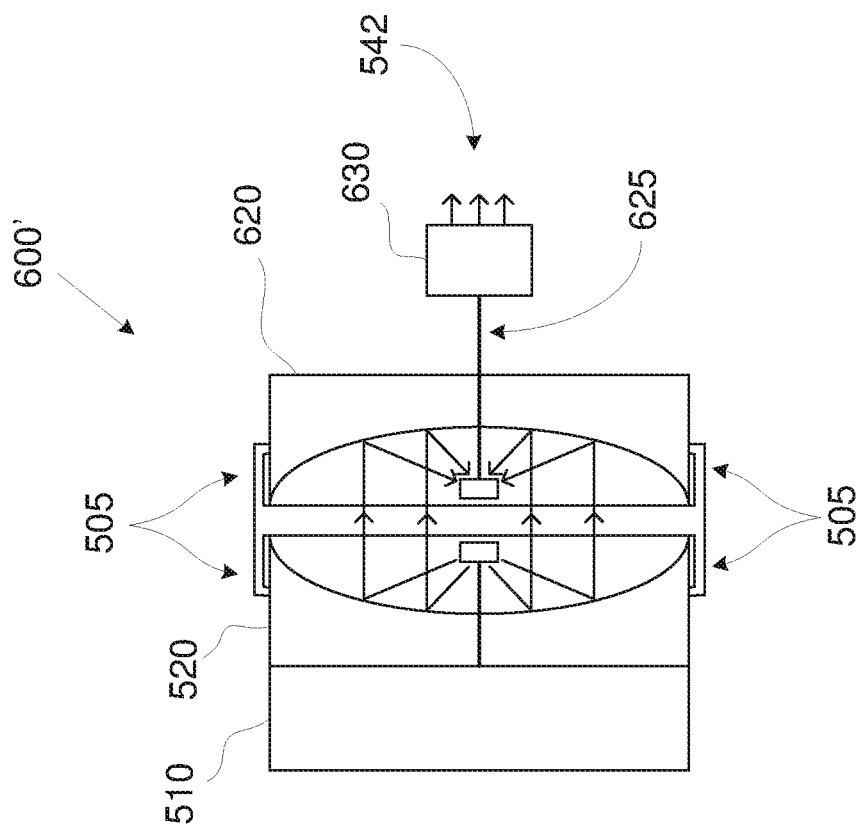
Figure 6A:
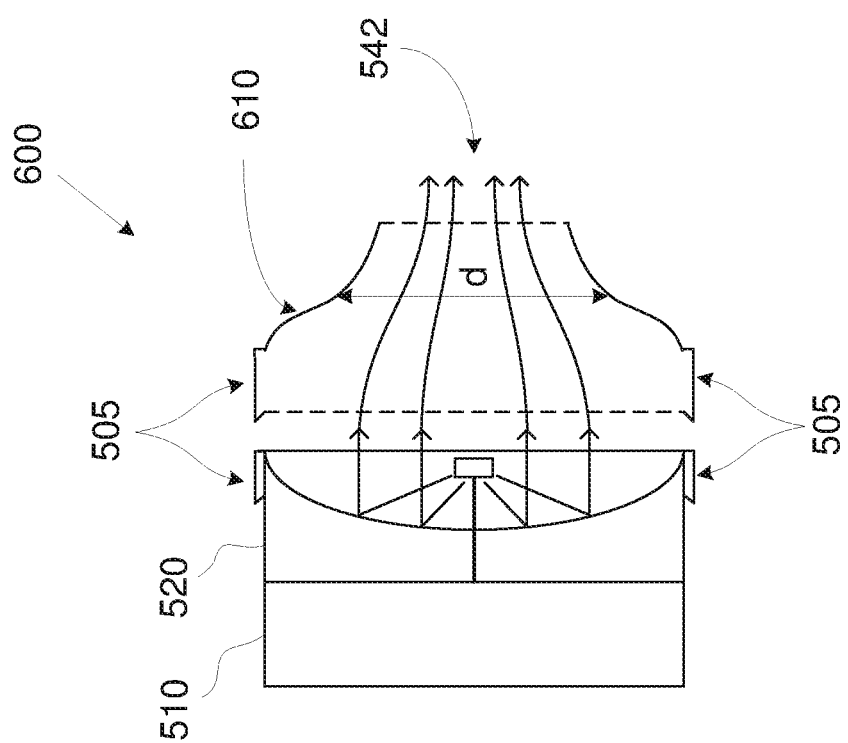

FIG. 6a shows third aspect of the antenna main lobe width altering device 600. Here a varying metallic tube 610 is employed to transform the electromagnetic field emitted from the existing antenna 520. A principle of said aspect is the function of an inverted horn antenna.

Consequently, according to an aspect, the antenna main lobe width altering device 600 also comprises a metallic tube arrangement 610 with varying inner dimension d. The metallic tube arrangement 610 is adapted to guide the emitted electromagnetic energy of the existing antenna device 520 from the aperture of the existing antenna 520 into a modified antenna aperture 542, thus providing a modified antenna main lobe of the existing antenna device 520.

FIG. 6b shows a fourth aspect of the antenna main lobe width altering device 600'. According to this aspect a collector antenna 620 picks up the electromagnetic field transmitted from the existing antenna 520 and delivers it via a signal conduit 625 to a secondary antenna 630 arranged to re-transmit said electromagnetic filed using a wider antenna main lobe compared to the antenna main lobe of the existing antenna 520.

According to an aspect, the antenna main lobe width altering device 600' further comprises a collector antenna 620, a signal conduit 625, and a secondary antenna 630. The collector antenna 620 is arranged to receive the emitted electromagnetic energy of the existing antenna device 520 and to forward said electromagnetic energy via the signal conduit 625 to the secondary antenna 630. The secondary antenna 630 is arranged to re-transmit the electromagnetic energy using a secondary antenna main lobe, thus providing a modified antenna main lobe of the existing antenna device 520.

Figure 7C:
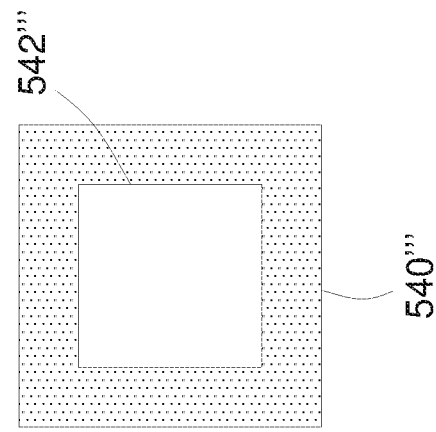
FIG. 7 shows various examples of antenna aperture shapes.
Figure 7B:
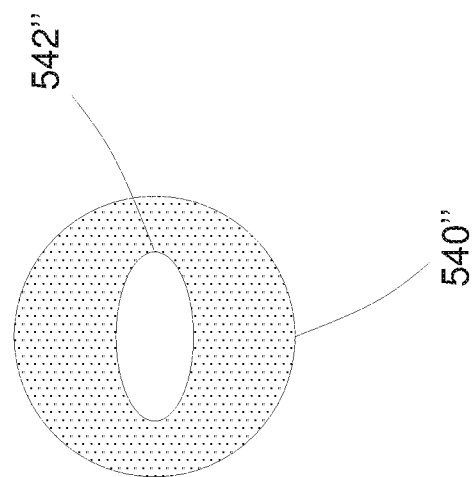
Figure 7A:
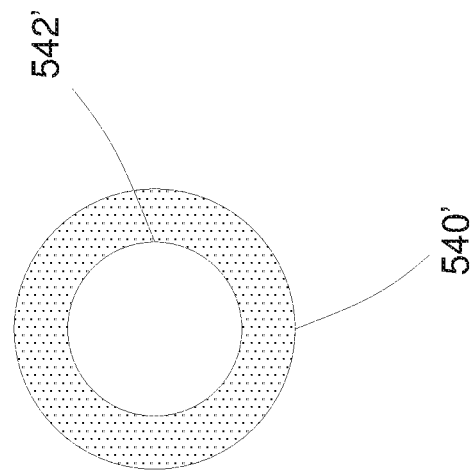

FIGS. 7a-7c show various antenna example openings 542', 542", 542'" of the disclosure. These antenna openings can be used with either of the antenna main lobe width altering devices 500, 500', 600, 600' shown in FIG. 5 and in FIG. 6. Note however that the disclosure is not limited to these openings only, but that a wide variety of openings can be used without loss of functionality. Thus, circular openings 542', elliptic openings 542" and rectangular openings are used in various aspects of the disclosed antenna main lobe width altering devices 500, 500', 600, 600'.

FIGS. 7a-7c further show various geometries of the absorption material 540', 540", 540'".

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method for positioning a first and a second radio antenna, the method comprising:
   disconnecting the first radio antenna from an open waveguide antenna interface of a radio transceiver such that the radio transceiver is configured to transmit a widened main lobe L1 via the open waveguide antenna interface;
   configuring the second radio antenna to be a directive antenna having a main lobe L2 having a more narrow main lobe width than the main lobe L1;
   transmitting a first alignment signal to the second radio antenna via the open waveguide antenna interface while the first radio antenna is disconnected and the main lobe L2 has the more narrow main lobe width than the main lobe L1;
   positioning the second radio antenna based on the received first alignment signal;
   connecting the first radio antenna to the open waveguide antenna interface such that the first radio antenna is reconfigured to be a directive antenna having a main lobe L3, the main lobe L3 having a more narrow main lobe width than the main lobe L1;
   after the connecting and reconfiguring of the first antenna, transmitting a second alignment signal from the second antenna to the first antenna; and
   positioning the first antenna based on the received second alignment signal.

2. The method of claim 1:
   wherein the positioning the second radio antenna comprises aligning the second radio antenna with respect to the first alignment signal; and
   wherein the positioning the first radio antenna comprises aligning the first radio antenna with respect to the second alignment signal.

3. The method of claim 1, wherein:
   the first radio antenna comprises either or both of a vertically polarized and a horizontally polarized antenna;

the second radio antenna comprises either or both of a vertically polarized and a horizontally polarized antenna; and wherein, in the case that the first and second radio antennas are both vertically or horizontally polarized, or both, the positioning the first radio antenna and the positioning the second radio antenna comprise independent positioning on the relevant horizontal and vertical polarization.

4. The method of claim 1:

wherein the positioning the second radio antenna comprises directing the main lobe L2 of the second radio antenna in elevation angle and azimuth angle based on the received first alignment signal; and wherein the positioning the first radio antenna comprises directing the main lobe L3 of the first radio antenna in elevation angle and azimuth angle based on the received second alignment signal.

5. The method of claim 4:

wherein the directing the main lobe L2 comprises evaluating at least one performance metric as a function of the position of the second radio antenna and the direction of the main lobe L2;

wherein the at least one performance metric comprises at least one of:
a received signal power;
a detection mean-squared-error; and
a bit error rate; and wherein the positioning the second radio antenna comprises selecting a preferred direction of the main lobe L2 based on the at least one evaluated performance metric.

6. The method of claim 5:

wherein the directing the main lobe L3 comprises evaluating at least one performance metric as a function of the position of the first antenna and the direction of the main lobe L3;

wherein the at least one performance metric comprises at least one of:
a received signal power;
a detection mean-squared-error; and
a bit error rate; and wherein the positioning the first radio antenna comprises selecting a preferred direction of the main lobe L3 based on the at least one evaluated performance metric.

7. The method of claim 6, wherein:

directing the main lobe L2 and the directing the main lobe L3 both comprise evaluating the at least one performance metric over a pre-determined duration of time to determine a first stability metric of the at least one performance metric;

selecting the preferred direction of the main lobe L2 is based on the first stability metric; and selecting the preferred direction of the main lobe L3 is based on the first stability metric.

8. The method of claim 6, wherein:

directing the main lobe L2 and the directing the main lobe L3 both comprise evaluating the at least one performance metric over a pre-determined frequency range to determine a second stability metric of the at least one performance metric;

selecting the preferred position of the main lobe L2 is based on the second stability metric; and selecting the preferred position of the main lobe is based on the second stability metric.

9. The method of claim 1, wherein the first and the second antennas are in a non-line-of-sight (NLOS) configuration.

10. The method of claim 1 wherein disconnecting the first radio antenna from the open waveguide antenna interface further configures the first radio antenna to be an omnidirectional antenna having a uniform and omnidirectional main lobe L1.

11. The method of claim 1:

wherein the first radio antenna comprises an antenna array with a steerable antenna pattern; and wherein the method further configuring comprises steering the antenna pattern into a directive antenna pattern comprising the main lobe L3.

12. A first transceiver arrangement comprising:

a first radio transceiver;

an open waveguide antenna interface;

a first antenna removably connected to the first radio transceiver via the open waveguide antenna interface;

wherein the first radio transceiver is configured to:
transmit a first alignment signal, via the open waveguide antenna interface and a main lobe L1 while the first antenna is disconnected, to a second antenna having a main lobe L2 that has a more narrow main lobe width than the main lobe L1; and receive a second alignment signal while the first antenna is connected and using a main lobe L3 that has a more narrow main lobe width than the main lobe L1, the second alignment signal having been sent from the second antenna via the main lobe L2 and in response to the first alignment signal; and an alignment tool connected to the first radio transceiver and comprising processing circuits configured to measure at least one performance metric based on the second alignment signal as a function of the position of the first antenna and the direction of the main lobe L3;

wherein the at least one performance metric comprises at least one of:
a received signal power;
a detection mean-squared-error; and
a bit error rate.

13. The first transceiver arrangement of claim 12, wherein the first antenna comprises either or both of:
a vertically polarized antenna positionable on the vertical polarization; and
a horizontally polarized antenna positionable on the horizontal polarization.

14. The first transceiver arrangement of claim 12, wherein the first antenna is positionable in elevation angle and azimuth angle.

15. The first transceiver arrangement of claim 12, wherein the processing circuits are further configured to select a preferred direction of the main lobe L3 based on the at least one performance metric.

16. The first transceiver arrangement of claim 15, wherein the processing circuits are further configured to evaluate the at least one performance metric over a pre-determined duration of time to determine a stability metric of the at least one performance metric, and select the preferred direction of the main lobe L3 based on the stability metric.

17. The first transceiver arrangement of claim 12, wherein to transmit the first alignment signal via the open waveguide antenna interface while the first antenna is disconnected, the first radio transceiver is configured to transmit via the open waveguide antenna interface such that main lobe L1 is uniform and omnidirectional.

18. The first transceiver arrangement of claim 12, wherein the first antenna comprises an antenna array with a steerable antenna pattern; and the first radio transceiver is further configured to steer the antenna pattern into a directive antenna pattern comprising the main lobe L3.

* * * * *